(12) United States Patent
Gruber et al.

(10) Patent No.: US 10,110,034 B2
(45) Date of Patent: Oct. 23, 2018

(54) DUAL RECHARGEABLE BATTERY ARRANGEMENT

(71) Applicant: Bayerische Motoren Werke Aktiengesellschaft, Munich (DE)

(72) Inventors: Dominik Gruber, Roefingen (DE); Joerg Reuss, Unterschleissheim (DE); Andre Schmitz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 17 days.

(21) Appl. No.: 15/680,692

(22) Filed: Aug. 18, 2017

(65) Prior Publication Data

US 2017/0346326 A1 Nov. 30, 2017

Related U.S. Application Data

(63) Continuation of application No. PCT/EP2016/051058, filed on Jan. 20, 2016.

(30) Foreign Application Priority Data

Feb. 19, 2015 (DE) ........................ 10 2015 202 975

(51) Int. Cl.
*H02J 7/00* (2006.01)
*B60L 11/18* (2006.01)
*H02P 27/06* (2006.01)

(52) U.S. Cl.
CPC ......... *H02J 7/0063* (2013.01); *B60L 11/1803* (2013.01); *B60L 11/1851* (2013.01); *H02P 27/06* (2013.01); *H02J 2007/0067* (2013.01)

(58) Field of Classification Search
CPC ...... H02J 7/0065; H02J 7/0086; H02J 7/0081; H02J 7/045; H02J 7/04; H02J 7/16;
(Continued)

(56) References Cited

U.S. PATENT DOCUMENTS

| 5,710,699 A | 1/1998 | King et al. |
| 2010/0275810 A1* | 11/2010 | Barbee ...................... B61C 3/02 105/50 |

(Continued)

FOREIGN PATENT DOCUMENTS

| DE | 20 2008 017 499 U1 | 11/2009 |
| DE | 20 2009 017 862 U1 | 8/2010 |

(Continued)

OTHER PUBLICATIONS

PCT/EP2016/051058, International Search Report dated Mar. 31, 2016 (Two (2) pages).

(Continued)

*Primary Examiner* — Bickey Dhakal
(74) *Attorney, Agent, or Firm* — Crowell & Moring LLP

(57) ABSTRACT

The rechargeable battery arrangement includes a first plurality of series-connected first charge storage cells, a second plurality of series-connected second charge storage cells, and a third plurality of series-connected third charge storage cells. The arrangement further includes a first converter having a first connection pair is connected to the third plurality of series-connected third charge storage cells, and a second connection pair, connected in series with the first plurality of series-connected first charge storage cells. A series connection consisting of the first plurality of first charge storage cells and the first converter is connected in parallel to the second plurality of second charge storage cells. Moreover, the first converter is configured to convert at least one of a voltage and a current supplied by the third plurality of series-connected third charge storage cells, and to output said voltage and/or current at the second connection pair. In addition, a lowest potential of the second plurality of series-connected second charge storage cells forms a first connection of the accumulator arrangement, and a highest potential of the second plurality of series-con-
(Continued)

nected second charge storage cells forms a second connection of the accumulator arrangement.

16 Claims, 7 Drawing Sheets

(58) Field of Classification Search
CPC .. H02J 3/28; H02J 7/0024; H02J 1/102; H02J 7/34; H02J 13/0003
See application file for complete search history.

(56) References Cited

U.S. PATENT DOCUMENTS

| | | | |
|---|---|---|---|
| 2012/0235473 A1 | 9/2012 | Jiang et al. | |
| 2012/0299374 A1* | 11/2012 | Proebstle | B60R 16/03 307/9.1 |
| 2012/0313584 A1* | 12/2012 | Sugiyama | B60L 11/123 320/119 |
| 2014/0111122 A1* | 4/2014 | Kawashima | H02J 7/0029 318/139 |

FOREIGN PATENT DOCUMENTS

| | | | |
|---|---|---|---|
| DE | 10 2011 018 682 A1 | 12/2011 | |
| DE | 10 2013 203 983 A1 | 9/2014 | |
| DE | 102013203983 A1 * | 9/2014 | ............. H02J 1/102 |
| EP | 1 424 494 A1 | 6/2004 | |
| WO | WO 2011/095366 A2 | 8/2011 | |

OTHER PUBLICATIONS

German Search Report issued in German counterpart application No. 10 2015 202 975.1 dated Jul. 14, 2015, with Statement of Relevancy (Nine (9) pages).

* cited by examiner

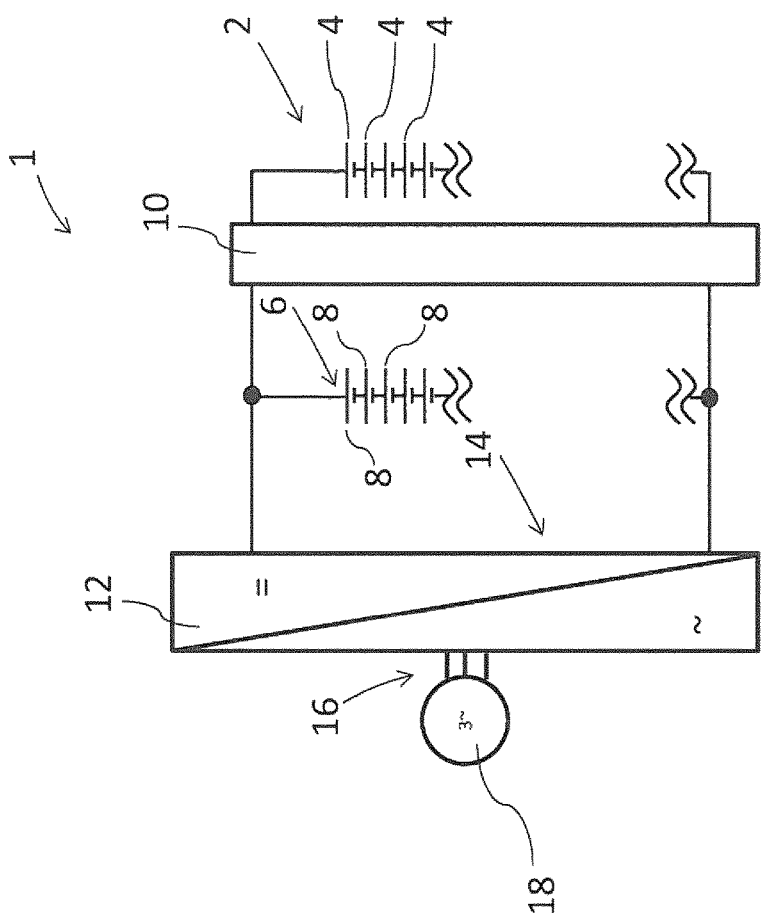

DUAL RECHARGEABLE BATTERY ARRANGEMENT

CROSS REFERENCE TO RELATED APPLICATIONS

This application is a continuation of PCT International Application No. PCT/EP2016/051058, filed Jan. 20, 2016, which claims priority under 35 U.S.C. § 119 from German Patent Application No. 10 2015 202 975.1, filed Feb. 19, 2015, the entire disclosures of which are herein expressly incorporated by reference.

BACKGROUND AND SUMMARY OF THE INVENTION

The present invention relates to an improved dual rechargeable battery arrangement having cells that are optimized for a high capacitance, and cells that are optimized for a high power output.

For the power scaling in the case of electrochemical energy storage systems in a vehicle, capacitance-optimized accumulator cells and power-optimized accumulator cells or dual-layer capacitors are installed in an accumulator arrangement in a mixed fashion, which is usually called a dual accumulator in the state of the art. As a rule, a string or several strings of capacitance-optimized cells are connected parallel to one string or several strings of power-optimized cells. As a rule, the strings are coupled by means of a DC-to-DC converter which is connected parallel to the strings. The DC-to-DC converter compensates different voltages between the strings.

German Patent Documents DE 20 2009 017 862 U1 and DE 20 2008 017 499 U1 describe parallel connections of batteries.

It is a disadvantage of the state of the art that the DC-to-DC converter has to be designed for the maximal peak power of the connected string. Such a DC-to-DC converter requires high expenditures and results in high costs.

It is an object of the invention to create an improved accumulator arrangement having cells that are optimized for a current output and having cells that are maximized with respect to capacitance.

The object of the invention is achieved by an accumulator arrangement having a first plurality of series-connected first charge storage cells, a second plurality of series-connected second charge storage cells and a third plurality of series-connected third charge storage cells. According to the invention, the accumulator arrangement has a first converter, to whose first connection pair the third plurality of series-connected third charge storage cells is connected. The second connection pair of first converters is connected in series with the first plurality of series-connected first charge storage cells. The series connection of the first plurality of first charge storage cells and the first converter is connected parallel to the second plurality of second charge storage cells. The first converter is designed for converting the voltage supplied by the third plurality of series-connected charge storage cells and/or the current supplied by the third plurality of series-connected charge storage cells and outputting it at the second connection pair. The lowest potential of the second plurality of series-connected second cells forms a first connection of the accumulator arrangement, and the highest potential of the second plurality of series-connected second cells forms a second connection of the accumulator arrangement.

The accumulator arrangement may be connected, for example, by way of a contactor, to an inverter, to which an electric machine can be connected.

According to the invention, the first converter, which can replace the DC-to-DC converter of the state of the art, is not connected parallel by way of an entire cell string but only by way of a part of a string of series-connected charge storage cells. The first converter therefore does not have to be designed for the maximal peak power, but only for the part of the peak power that can be drawn by means of the third charge storage cells of the accumulator arrangement.

The accumulator arrangement may further have a second converter, whose first connection pair is connected to an energy source, particularly the second plurality of second charge storage cells, and whose second connection pair is connected to the third plurality of third charge storage cells. The second converter is designed for transporting an electric charge from an energy source, particularly the second plurality of second charge storage cells, to the third plurality of charge storage cells. By means of the second converter, the third charge storage cells can be charged and/or discharged. The energy source may be an electric machine in the generator operation, an arbitrary charging device or an electrochemical energy storage system.

The accumulator arrangement may have a third converter and a fourth plurality of series-connected fourth charge storage cells, which is connected to the first connection pair of the third converter. The second connection pair of the third converter is connected in series with the second plurality of second charge storage cells. The third converter is designed for converting the voltage supplied by the fourth plurality of series-connected charge storage cells and/or converting the current supplied by the fourth plurality of series-connected fourth charge storage cells and outputting them at the second connection pair of the third converter. By means of the first converter, it can be adjusted whether more charge of the first plurality of series-connected first charge storage cells and of the third plurality of series-connected third charge storage cells or of the second plurality of series-connected second charge storage cells is drawn. By means of the third converter, it can be adjusted which voltage is generated by the series connection of the second plurality of series-connected second charge storage cells and fourth plurality of series-connected fourth charge storage cells. As a result, the intermediate circuit voltage can be adjustable, which is present between the first connection and the second connection of the accumulator arrangement. As a result of the obtained degree of freedom of the adjustable intermediate circuit voltage, the drive system can be operated in an efficiency-optimized manner and, in addition, the armature setting range of the electric machine can be expanded.

The accumulator arrangement may further have a control device which is designed such that, if a machine connected to the accumulator arrangement, for a predefined period of time, in a dynamic operating condition, has a higher current consumption than in a static operating condition, the control device activates the first converter such that charge is drawn from the first plurality of series-connected first charge storage cells and the third plurality of series-connected third charge storage cells. The control device may also be designed such that, if the electric machine, for a predefined time period, has a constant power consumption, the control device activates the first converter such that charge is drawn only from the second plurality of series-connected second charge storage cells. This operating condition will then be relevant if the second cells are designed such that they have a capacitance that is as high as possible, and the first and third cells are designed for a current output that is as high as possible. A dynamic operating condition may be an increased torque output for a predefined period of time, for example, for accelerating a vehicle.

In the dynamic operating condition, charge can be drawn from the first plurality of series-connected first charge storage cells, from the second plurality of series-connected second charge storage cells and from the third plurality of series-connected third charge storage cells.

The control device may be designed such that, if the electric machine, for a predefined period of time, in a dynamic operating condition, has a higher current consumption than in a static operating condition, the control device activates the first converter such that the sum of the output voltage of the first converter and of the plurality of first charge storage cells is higher than the idling voltage of the second plurality of series-connected second charge storage cells. If, for a predetermined time period, the electric machine has a constant power consumption, for example, in a static operating condition, the control device can activate the first converter such that the sum of the output voltage of the first converter and of the first plurality of first charge storage cells is lower than the idling voltage of the second plurality of second charge storage cells.

The control device may also be designed such that, if the electric machine, for a predefined time period, during a dynamic operating condition, has a higher current consumption, the control device activates the first converter such that charge of the second plurality of series-connected second charge storage cells is drawn. If a constant power consumption takes place for a predefined period of time, the first converter can be activated by the control device such that charge is drawn only from the first plurality of series-connected first charge storage cells and the third plurality of series-connected third charge storage cells. This operating condition is relevant if the second charge storage cells are designed for a current output that is as high as possible, and the first and third charge storage cells are designed for a capacitance that is as high as possible. It is understood that, during the dynamic operating condition, charge can be drawn from the first plurality of first charge storage cells, the second plurality of second charge storage cells and the third plurality of third charge storage cells.

The control device is further designed such that, if the electric machine has a higher current consumption for a predefined period of time during a dynamic operating condition, the control device activates the first converter such that the sum of the output voltage of the first converter and of the first plurality of series-connected first charge storage cells is higher than the idling voltage of the second plurality of series-connected second charge storage cells. If the electric machine has a constant power consumption for a predefined period of time during a static operating condition, the control device can activate the first converter such that the sum of the output voltage of the first converter and of the first plurality of first charge storage cells is lower than the idling voltage of the second plurality of second charge storage cells.

The control device may be designed such that, if an electric machine connected to the accumulator arrangement has a higher current consumption for a predefined period of time, the control device activates the third converter such that charge is drawn from the first plurality of series-connected first charge storage cells, and, if the electric machine has a constant power consumption for a predefined period of time, the control device activates the third converter such that charge is drawn from the second plurality of series-connected second charge storage cells and the fourth plurality of series-connected fourth charge storage cells. This operating condition may be relevant if the first and third charge storage cells are optimized for a current output that is as high as possible, and the second and the fourth charge storage cells are optimized for a capacitance that is as high as possible.

The control device may be designed for controlling the second converter such that electric charge is drawn from the second plurality of second charge storage cells and is supplied to the third plurality of third charge storage cells. The control device can thereby control the recharging of the third plurality of series-connected third charge storage cells.

The first charge storage cells and the third charge storage cells may be designed or optimized for a higher current output or shorter current output than the second charge storage cells and the fourth charge storage cells. The second charge storage cells and the fourth charge storage cells may be designed or optimized for a higher capacitance than the first charge storage cells and the third charge storage cells. The first charge storage cells and the third charge storage cells may have a capacitor, for example, a so-called Supercap, double layer capacitors or the like. The second charge storage cells and the fourth charge storage cells may have an accumulator, such as a lithium-ion accumulator or the like.

The number of third charge storage cells may amount to fewer than approximately 25%, preferably fewer than approximately 20%, most preferably fewer than approximately 10% of the number of first charge storage cells. As a result the first converter has to be designed to be less powerful, whereby it can be manufactured at lower expenditures and requires less installation space in the vehicle or the accumulator arrangement.

The invention also relates to a drive system for a vehicle having an electric drive with the above-described accumulator arrangement, an inverter and an electric machine, wherein the connections of the accumulator arrangement, which form the intermediate circuit voltage, are connected by way of a contactor to the direct-current connections of the inverter, and the electric machine is connected to the alternating current connections of the inverter. The electric machine may operate as a drive motor and/or as a generator.

The control device may be designed for activating the second converter in the generator operation such that it charges the charge storage cells designed for a higher current output, before it charges the charge storage cells designed for a higher capacitance. The control device may be designed such that it preferably charges the first plurality of series-connected first charge storage cells and the third plurality of series-connected third charge storage cells.

It is understood that the control device is designed such that it activates the first converter such that simultaneously energy is drawn from the first plurality of series-connected first charge storage cells, the third plurality of series-connected third charge storage cells and the second plurality of second charge storage cells, if the electric machine is to supply a torque, or energy is fed, if the electric machine is to operate as a generator. Particularly in the high-load case, electric charge is simultaneously withdrawn from the first plurality of series-connected first charge storage cells, the second plurality of series-connected second charge storage cells and the third plurality of series-connected third charge storage cells. In the partial-load case, the charge is drawn only from the second plurality of series-connected second charge storage cells.

It is preferred that the first charge storage cells and the third charge storage cells are designed or optimized for a higher current output. As a result, losses of the accumulator arrangement or of the drive system can be reduced that may possibly arise during the continuous operation by the first converter.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will now be explained by means of non-limiting embodiments with reference to the attached figures.

FIG. 7 is a view of an accumulator arrangement of the state of the art.

DETAILED DESCRIPTION OF THE DRAWINGS

Figure 1:
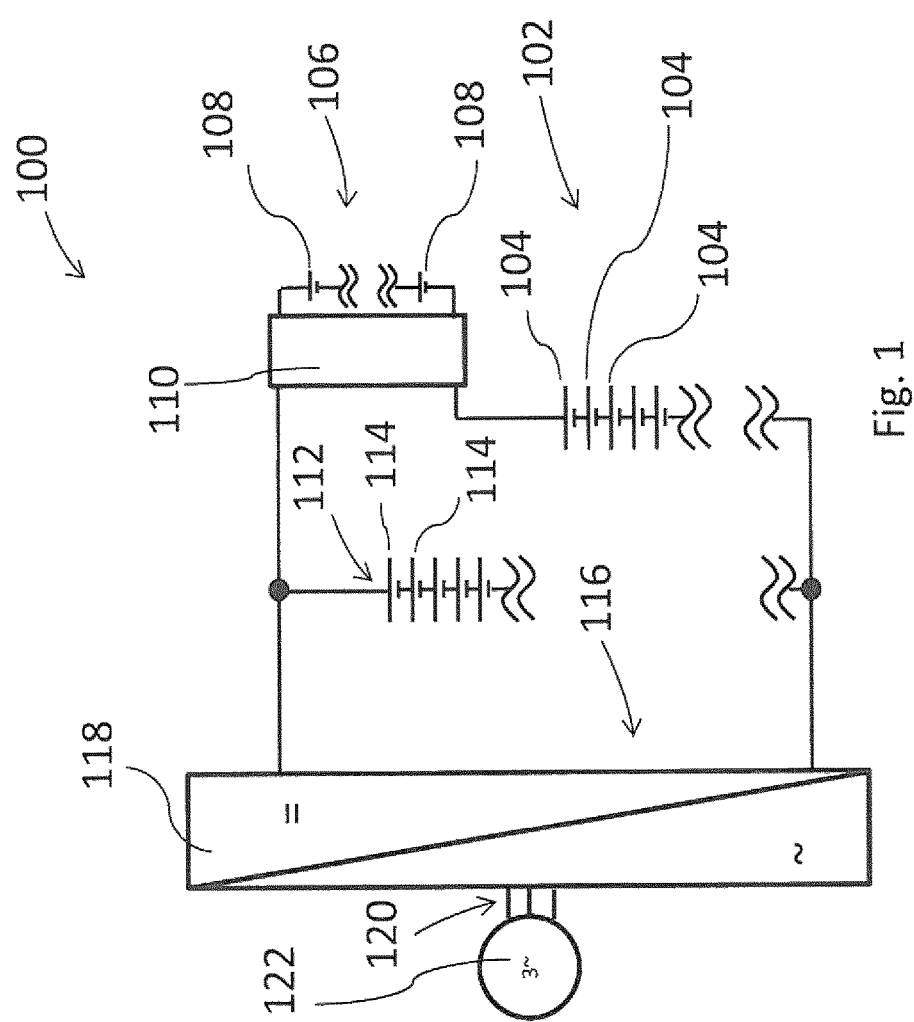
FIG. 1 is a view of circuit diagram of a first embodiment of the invention.

FIG. 7 illustrates an accumulator arrangement 1 of the state of the art having output connections 14, to which an inverter 12 is connected, an electric machine 18 being connected to the alternating-current connections 16 of this inverter 12. The accumulator arrangement 1 of the state of the art comprises a first series connection 2 of first charge storage cells 4, for example, capacitors, which are designed for high current output. The first series connection 2 of first charge storage cells 4 is connected to a DC-to-DC converter 10, which is connected to a second series connection 6 of second charge storage cells 8 that are optimized for high capacitance. The second charge storage cells 8 may, for example, be lithium-ion cells. The second series connection 6 of second charge storage cells 8 forms the intermediate circuit voltage and is connected to the direct-current-side input 14 of the inverter 12.

The DC-to-DC converter 10 has to be designed such that it can convert the total power that can be supplied by the first series connection 2 of the first charge storage cells, whereby its production requires high expenditures and a lot of space.

A first embodiment of an accumulator arrangement 100 according to the invention will be explained with reference to FIG. 1. The accumulator arrangement 100 comprises a first series connection 102 of a plurality of first charge storage cells 104. The output connections of a first DC-to-DC converter 110 are connected in series with the first series connection 104. A third plurality 108 of third charge storage cells 106 is connected to the input connections of the first DC-to-DC converter 110. The accumulator arrangement 100 further comprises a second plurality 112 of second charge storage cells 114. The second plurality 112 of second charge storage cells 114 is connected parallel to the series connection of the first DC-to-DC converter 110 and the first series connection 102 of first charge storage elements. The output voltage of the second series connection 112 of second charge storage elements 114 forms the so-called intermediate circuit voltage, which is connected to direct-current connections 116 of an inverter 118, whose output connections 120 are connected to an electric machine 122.

The second charge storage elements 114 are designed for high capacitance and are formed, for example, by lithium-ion cells. The first charge storage cells 104 and the third charge storage cells 108 are designed for a rapid and high current output and are formed, for example, by capacitors.

In the case of the accumulator arrangement 100 illustrated in FIG. 1, the second series connection 112 comprises a number of 96 second charge storage cells 114. The first series connection 102 comprises 80 first charge storage cells 104. The third series connection 106 of third charge storage cells 108 comprises 16 charge storage cells. Therefore, only 16 third charge storage cells 108 are connected to the first DC-to-DC converter 110. Therefore, only one sixth of the voltage, compared with the state of the art illustrated in FIG. 7, is present at the input connections of the first DC-to-DC converter. The first DC-to-DC converter 110 can therefore be designed to be significantly weaker than what is required in the state of the art. Thus, on the one hand, expenditures for producing the accumulator arrangement 110 according to the invention are reduced and, on the other hand, efficiency is improved because a DC-to-DC converter 110 with a lower voltage applied thereto, as a rule, has a lower absolute power dissipation, whereby consequently also the efficiency of the accumulator arrangement 100 is increased. In addition the space requirement is reduced.

The method of operation of the first embodiment will now be explained in greater detail with reference to FIGS. 2 and 3. The second series connection 112 of FIG. 1 is replaced by a replacement circuit diagram 103 consisting of a direct-current source 103a and an internal resistance 103b connected in series therein. The first series connection 102 generates as voltage in the amount of 328 V. The third series connection 106 of third charge storage cells 108 generates an input voltage of 66 V. If the first charge storage cells 104 and the second charge storage cells 108 are to supply no current, for example, because a vehicle is moving at a constant speed and the electric machine demands no power, the first DC-to-DC converter 110 has to compensate a voltage difference of 360 V−328 V=32 V. As a result, an output voltage of 32 V has to be present at the output connections of the first DC-to-DC converter.

Figure 3:
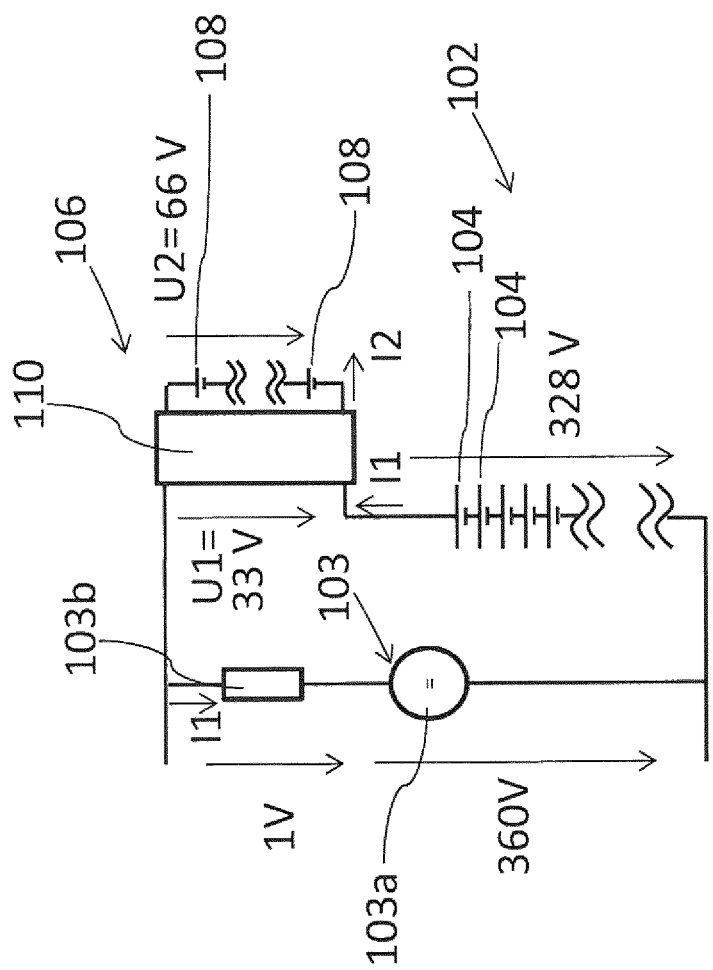
FIG. 3 is a view of further details of the wiring of the first embodiment of the invention.

FIG. 3 illustrates a condition in which current I1 is to be supplied by the first series connection 102 of first charge storage cells as well as by the first DC-to-DC converter 110. For this purpose, a voltage U1 of 33 V has to be present at the output connections of the first DC-to-DC converter 110. In the condition illustrated in FIG. 3, the voltage of the third plurality 106 of third charge storage cells 108 amounts to 66V. The current I2 in the third plurality of third charge storage cells 108 is calculated as follows:

$$I2 = \frac{U1 \times I1}{U2 \times \eta};$$

wherein η is the efficiency of the first DC-to-DC converter.

As a result, the current I2 flowing in the third plurality 106 of third charge storage cells 108 is dependent on the efficiency η of the first DC-to-DC converter. The charging condition of the first series connection 102 of first charge storage cells 104 therefore differs from that of the third series connection 106 of third charge storage cells 108. The third series connection 106 of third charge storage cells 108 therefore has to be charged separately from the first series connection 102 of first charge storage cells 104.

Figure 2:
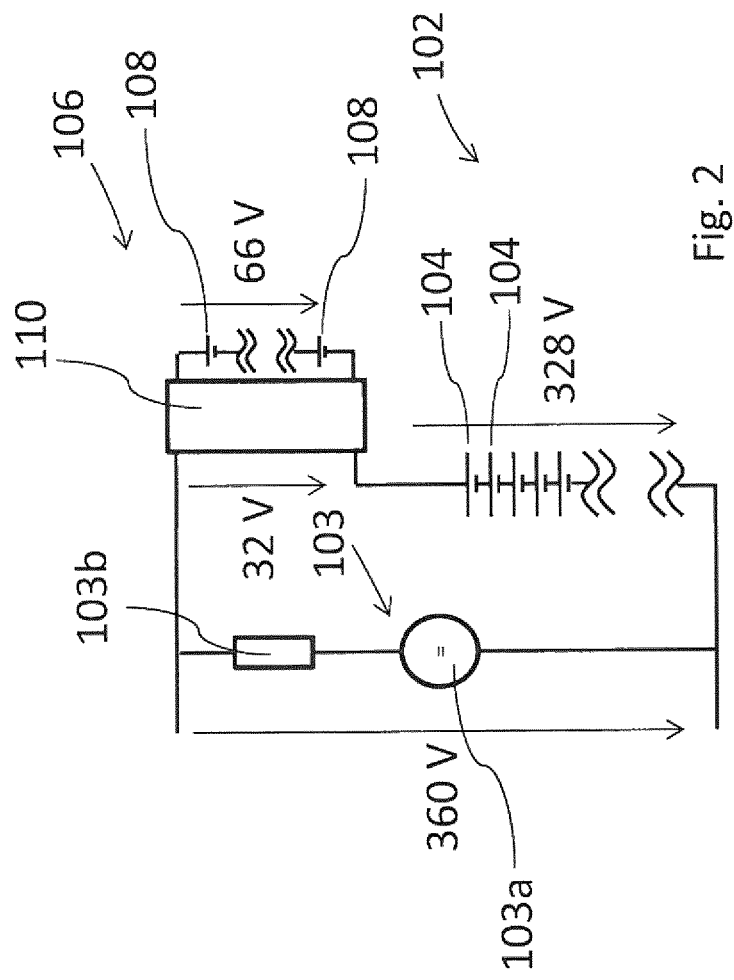
FIG. 2 is a view of details of a wiring of the first embodiment of the invention.
Figure 4:
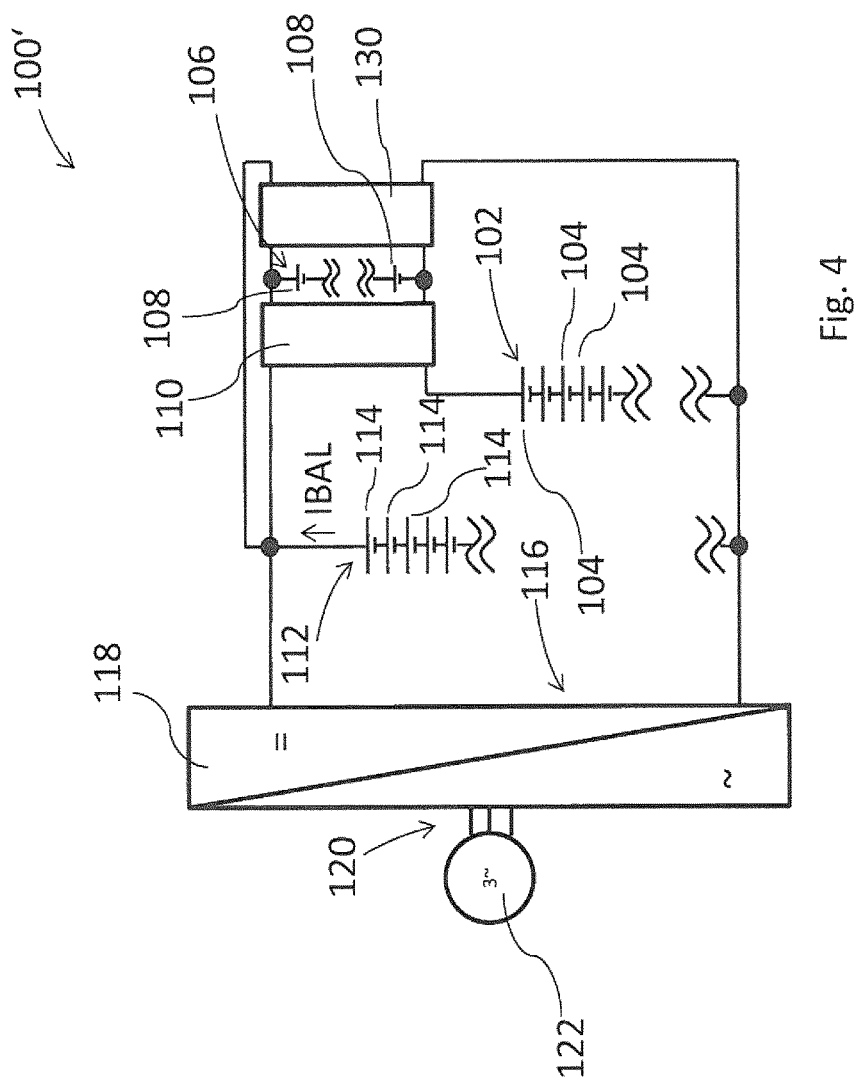
FIG. 4 is a view of an expansion of the first embodiment of the invention.

Reference is made to FIG. 4, which shows a second embodiment of the invention, which corresponds essentially to the first embodiment illustrated in FIGS. 1 to 3. In terms of precision, only those components will be described in the following which are additions to the second embodiment compared to the first embodiment. Compared to the first embodiment, the second embodiment of the accumulator arrangement 100' according to the invention comprises an additional second DC-to-DC converter 130, whose output connections are connected to the third series connection 106 of third charge storage cells 108. The input connections of the second DC-to-DC converter 130 are connected to the second series connection 112 of second charge storage devices 114. By means of the second DC-to-DC converter 130, the charging condition of the third series connection 106 of third charge storage cells 108 can be changed independently of the charging condition of the series connection 102 of first charge storage cells 104. It thereby becomes possible to symmetrize the charging condition of the third series connection 106 of third charge storage cells 108 with the charging condition of the first series connection of first storage cells 104. As a result, the method of operation and the activation of the accumulator arrangement 100' according to the invention can be simplified and improved. The inventors of the present invention assume that the necessary symmetrization current IBAL is comparatively low because only some of the losses have to compensated in the battery system, and because the battery system or the second DC-to-DC converter, as a rule, has a high efficiency. The second DC-to-DC converter 130 therefore only has to have a relatively low efficiency in comparison to the DC-to-DC converter 110.

Figure 5:
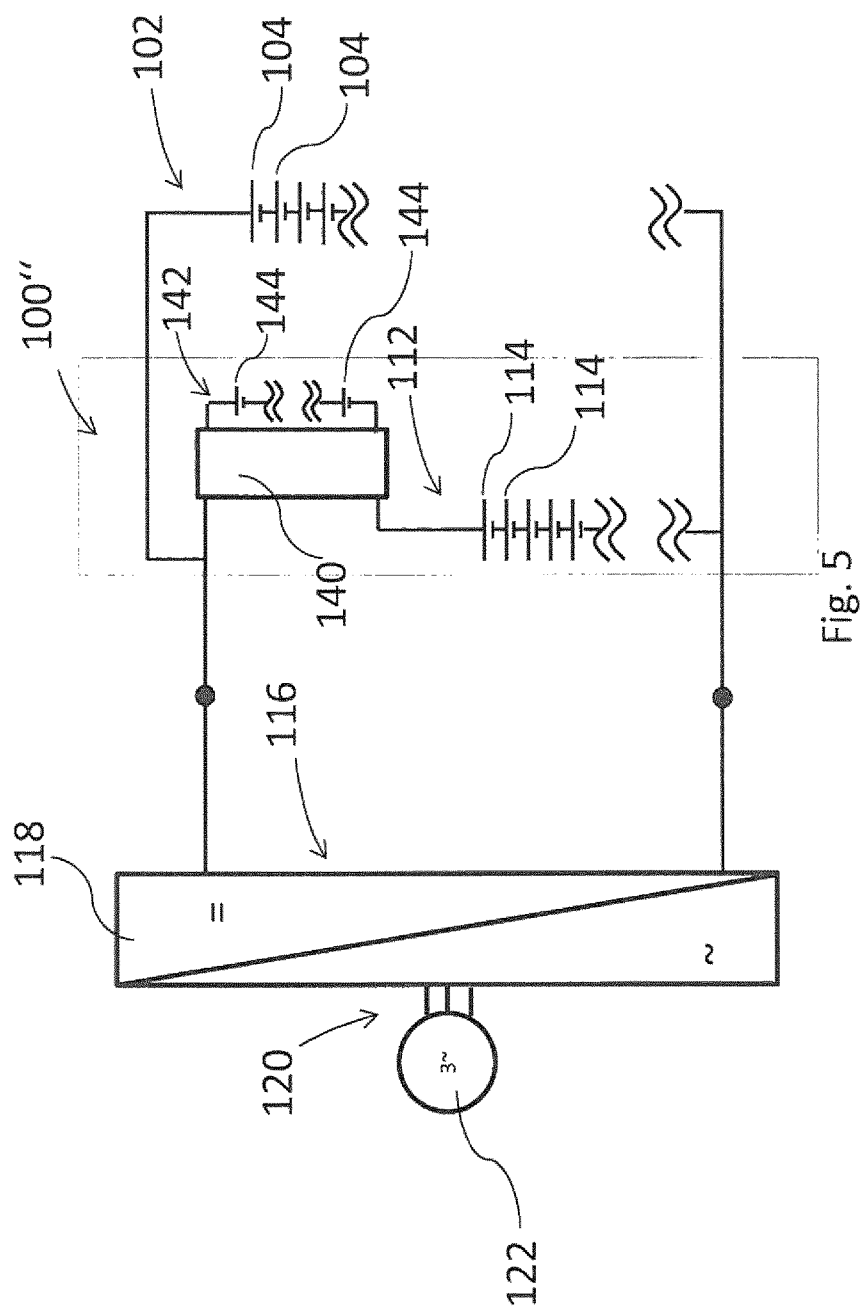
FIG. 5 is a view of a second embodiment of the invention.

FIG. 5 shows a third embodiment of the invention, which essentially shows the same components as the first embodiment of the invention that was described with reference to FIGS. 1 to 3. A first series connection 102 of first charge storage cells 104 is not linked by means of a DC-to-DC converter 110 to the intermediate circuit and thus to the inverter 118. In contrast to the first embodiment, the second embodiment of the accumulator arrangement 100" according to the invention only has a third DC-to-DC converter 140, whose output connections are connected in series with the second series connection 112 of second charge storage cells 114. A fourth series connection 142 of fourth charge storage cells 144 is connected to the input connections of the third DC-to-DC converter 140.

As mentioned above, the first charge storage cells 104 are designed or optimized for a rapid and high current output and are formed, for example, by capacitors. The second charge storage elements 114 and the fourth charge storage elements 144 are designed for a permanent current output and are formed by accumulators, such as lithium-ion accumulators.

The third embodiment has the advantage that the power of the first charge storage cells 104 becomes available particularly rapidly and without any losses.

Figure 6:
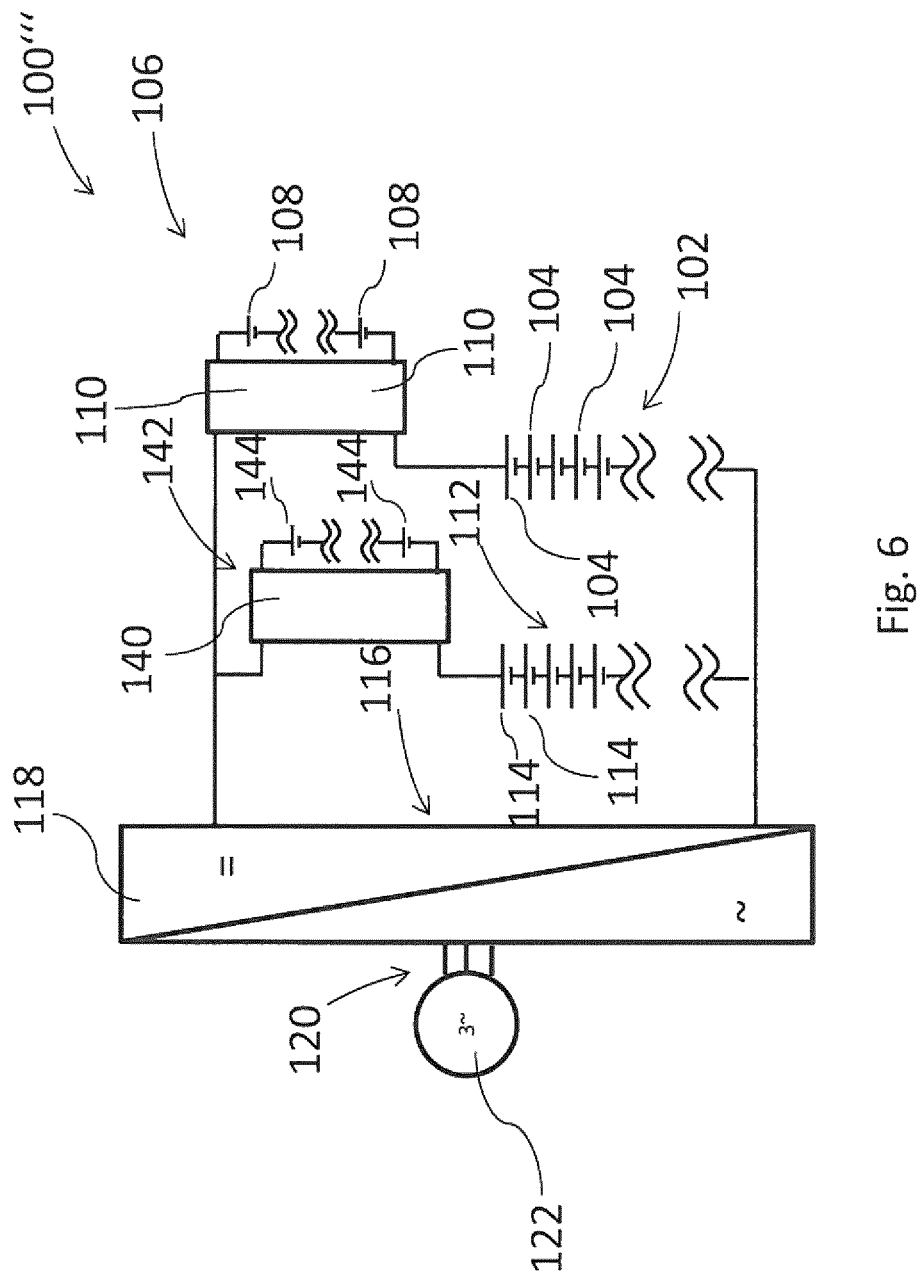
FIG. 6 is a view of a third embodiment of the invention.

Reference is made to FIG. 6, which illustrates a fourth embodiment of the accumulator arrangement 100''' according to the invention, which essentially is a combination of the first embodiment described with reference to FIGS. 1 to 3 and of the second embodiment of the invention described with reference to FIG. 5. The output connections of the third embodiment of the accumulator arrangement 100''', which form the intermediate circuit voltage of an inverter 118, are connected to a series connection consisting of the first DC-to-DC converter 110 and the first series connection 102 or first charge storage cells 104 and parallel to the series connection consisting of the third DC-to-DC converter 140 and the second series connection 112 of second charge storage cells 114. A third series connection 106 of third charge storage cells 108 is connected to the input connections of the first DC-to-DC converter 110. A third series connection 142 of third charge storage cells 144 is connected to the input connections of the third DC-to-DC converter.

The first charge storage cells 104 and the third charge storage cells 108 may be optimized for a rapid and high current output and be formed, for example, by means of capacitors. The second charge storage cells 114 and the fourth charge storage cells 144 may be optimized for a capacitance that is as high as possible and may be formed, for example, by accumulator cells. This embodiment also may have a second DC-to-DC converter 130 in order to symmetrize the charge storage cells.

According to the invention, only partial cells of one cell string are connected parallel to another cell string by means of a DC-to-DC converter. The DC-to-DC converter and the cells of a partial string connected thereto may be called a current valve, which controls as to when charge is drawn from which of the parallel connected strings. The invention has the advantage that the DC-to-DC converters can be designed to be less efficient, whereby expenditures, installation space and power dissipation are reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An accumulator arrangement comprising:
 a first plurality of series-connected first charge storage cells;
 a second plurality of series-connected second charge storage cells;
 a third plurality of series-connected third charge storage cells;
 a first converter comprising a first connection pair and a second connection pair, wherein the first connection pair of the first converter is connected to the third plurality of series-connected third charge storage cells,
  wherein the second connection pair of the first converter is connected in series with the first plurality of series-connected first charge storage cells,
  wherein a series connection consisting of the first plurality of first charge storage cells and the first converter is connected in parallel to the second plurality of second charge storage cells,
  wherein the first converter is configured to convert at least one of a voltage and a current supplied by the third plurality of series-connected third charge storage cells, and to output said at least one of the voltage and current supplied by the third plurality of series-connected third charge storage cells at the second connection pair, and
  wherein a lowest potential of the second plurality of series-connected second charge storage cells forms a first connection of the accumulator arrangement, and a highest potential of the second plurality of series- connected second charge storage cells forms a second connection of the accumulator arrangement; and
a control device,
wherein, if an electric machine connected to the accumulator arrangement has a higher current consumption for a predefined period of time, the control device is configured to activate the first converter such that charge is drawn from the first plurality of series-connected first charge storage cells and from the third plurality of series-connected third charge storage cells, and
wherein, if the electric machine has a constant power consumption for a predefined period of time, the control device is further configured to activate the first converter such that charge is drawn only from the second plurality of series-connected second charge storage cells.

2. The accumulator arrangement according to claim 1, further comprising:
a second converter comprises a first connection pair and a second connection pair,
wherein the first connection pair of the second converter is connected to the second plurality of second charge storage cells,
wherein the second connection pair of the second converter is connected to the third plurality of third charge storage cells, and
wherein the second converter is configured to transport an electric charge from the second plurality of second charge storage cells to the third plurality of third charge storage cells.

3. The accumulator arrangement according to claim 2, wherein the control device is configured to activate the second converter such that charge is drawn from the second plurality of second charge storage cells and is supplied to the third plurality of third charge storage cells.

4. The accumulator arrangement according to claim 2, wherein said first charge storage cells and third charge storage cells are configured for a higher current output and/or a shorter-duration current output than the second charge storage cells, and
wherein the second charge storage cells are configured for a higher capacitance than the first charge storage cells and the third charge storage cells.

5. The accumulator arrangement according to claim 4, wherein the first charge storage cells and the third charge storage cells comprise a capacitor, and that the second charge storage cells comprise an accumulator.

6. The accumulator arrangement according to claim 1, further comprising:
a third converter comprises a first connection pair and a second connection pair; and
a fourth plurality of series-connected fourth charge storage cells connected to the first connection pair of the third converter,
wherein the second connection pair of the third converter is connected in series with the second plurality of second charge storage cells,
wherein the third converter is configured to convert at least one of a voltage and a current supplied by the fourth plurality of series-connected fourth charge storage cells, and output the at least one of the voltage and a current supplied by the fourth plurality of series-connected fourth charge storage cells at the second connection pair of the third converter.

7. The accumulator arrangement according to claim 6,
wherein, if an electric machine connected to the accumulator arrangement has a higher current consumption for a predefined time period, the control device is further configured to activate the third converter such that charge is drawn from the first plurality of series-connected first charge storage cells, and
wherein, if the electric machine has a constant power consumption for a predefined period of time, the control device is further configured to activate the third converter such that charge is drawn only from the second plurality of series-connected second charge storage cells and the fourth plurality of series-connected fourth charge storage cells.

8. The accumulator arrangement according to claim 6,
wherein said first charge storage cells and third charge storage cells are configured for a higher current output and/or a shorter-duration current output than the second charge storage cells, and
wherein the second charge storage cells are configured for a higher capacitance than the first charge storage cells and the third charge storage cells.

9. The accumulator arrangement according to claim 8,
wherein the first charge storage cells and the third charge storage cells comprise a capacitor, and that the second charge storage cells comprise an accumulator.

10. The accumulator arrangement according to claim 1,
wherein said first charge storage cells and third charge storage cells are configured for a higher current output and/or a shorter-duration current output than the second charge storage cells, and
wherein the second charge storage cells are configured for a higher capacitance than the first charge storage cells and the third charge storage cells.

11. The accumulator arrangement according to claim 10,
wherein the first charge storage cells and the third charge storage cells comprise a capacitor, and that the second charge storage cells comprise an accumulator.

12. The accumulator arrangement according to claim 1,
wherein a number of third charge storage cells is lower than approximately 25% of a number of first charge storage cells.

13. A drive system for a vehicle having an electric drive, the drive system comprising:
the accumulator arrangement according to claim 1;
an inverter having AC and DC connections; and
an electric machine,
wherein the accumulator arrangement is connected to the DC connections of the inverter, and the electric machine is coupled to the AC connections of the inverter.

14. An accumulator arrangement comprising:
a first plurality of series-connected first charge storage cells;
a second plurality of series-connected second charge storage cells;
a third plurality of series-connected third charge storage cells; and
a first converter comprising a first connection pair and a second connection pair, wherein the first connection pair of the first converter is connected to the third plurality of series-connected third charge storage cells,
wherein the second connection pair of the first converter is connected in series with the first plurality of series-connected first charge storage cells,
wherein a series connection consisting of the first plurality of first charge storage cells and the first converter is connected in parallel to the second plurality of second charge storage cells, wherein the first converter is configured to convert at least one of a voltage and a current supplied by the third plurality of series-connected third charge storage cells, and to output said at least one of the voltage and current supplied by the third plurality of series-connected third charge storage cells at the second connection pair, and wherein a lowest potential of the second plurality of series-connected second charge storage cells forms a first connection of the accumulator arrangement, and a highest potential of the second plurality of series-connected second charge storage cells forms a second connection of the accumulator arrangement;

a third converter comprises a first connection pair and a second connection pair; and a fourth plurality of series-connected fourth charge storage cells connected to the first connection pair of the third converter, wherein the second connection pair of the third converter is connected in series with the second plurality of second charge storage cells, wherein the third converter is configured to convert at least one of a voltage and a current supplied by the fourth plurality of series-connected fourth charge storage cells, and output the at least one of the voltage and a current supplied by the fourth plurality of series-connected fourth charge storage cells at the second connection pair of the third converter.

15. The accumulator arrangement according to claim 14, further comprising:

a control device, wherein, if an electric machine connected to the accumulator arrangement has a higher current consumption for a predefined period of time, the control device is configured to activate the first converter such that charge is drawn from the first plurality of series-connected first charge storage cells and from the third plurality of series-connected third charge storage cells, and wherein, if the electric machine has a constant power consumption for a predefined period of time, the control device is further configured to activate the first converter such that charge is drawn only from the second plurality of series-connected second charge storage cells.

16. The accumulator arrangement according to claim 14, wherein, if an electric machine connected to the accumulator arrangement has a higher current consumption for a predefined time period, the control device is further configured to activate the third converter such that charge is drawn from the first plurality of series-connected first charge storage cells, and wherein, if the electric machine has a constant power consumption for a predefined period of time, the control device is further configured to activate the third converter such that charge is drawn only from the second plurality of series-connected second charge storage cells and the fourth plurality of series-connected fourth charge storage cells.

\* \* \* \* \*